United States Patent
Honda et al.

(10) Patent No.: US 7,471,305 B2
(45) Date of Patent: *Dec. 30, 2008

(54) CONSTANT ANGULAR VELOCITY DISK LABEL PRINTING

(75) Inventors: Kazuhiko Honda, Hamamatsu (JP); Tamon Kondo, Kyoto (JP)

(73) Assignee: Yamaha Corporation, Hamamatsu-shi (JP)

( * ) Notice: Subject to any disclaimer, the term of this patent is extended or adjusted under 35 U.S.C. 154(b) by 136 days.

This patent is subject to a terminal disclaimer.

(21) Appl. No.: 11/417,183

(22) Filed: May 4, 2006

(65) Prior Publication Data

US 2006/0197824 A1 Sep. 7, 2006

Related U.S. Application Data

(63) Continuation of application No. 11/338,659, filed on Jan. 25, 2006, now abandoned, which is a continuation of application No. 11/210,902, filed on Aug. 25, 2005, now Pat. No. 7,015,939, which is a continuation of application No. 10/053,238, filed on Oct. 29, 2001, now Pat. No. 7,268,794.

(30) Foreign Application Priority Data

Oct. 30, 2000 (JP) ............................ P 2000-330359

(51) Int. Cl.
*B41J 2/435* (2006.01)
*B41J 2/47* (2006.01)
*G01D 15/14* (2006.01)

(52) U.S. Cl. ...................... 347/224; 347/225

(58) Field of Classification Search ................. 347/248, 347/224–225; 369/53.23, 53.28; 360/77.06, 360/77.07

See application file for complete search history.

(56) References Cited

U.S. PATENT DOCUMENTS 4,027,217 A 5/1977 Harman (Continued)

FOREIGN PATENT DOCUMENTS

EP 0 329 122 B1 8/1989

(Continued)

OTHER PUBLICATIONS

Japanese Office Action issued Jul. 26, 2005.

(Continued)

*Primary Examiner*—Hai C Pham
*Assistant Examiner*—Kainoa B Wright
(74) *Attorney, Agent, or Firm*—Crowell & Moring LLP

(57) ABSTRACT

A visible light characteristic changing layer is formed in a location which can be viewed from a part of a label surface of an optical medium. The optical medium is set on a turntable of an optical disk unit, which may be rotated at a constant angular velocity, while the power of a laser beam is modulated in accordance with image data. The optical pickup operates at a first power level when changing a visible light characteristic of the optical medium to form the visible information and the optical pickup operates at a lower power level when not changing a visible light characteristic of the optical medium. As a result, a visible-light reflectivity of the visible light characteristic changing layer is changed, thereby forming a image corresponding to the image data on the label surface. A tracking servo operation is turned off while the optical pickup forms the visible information.

13 Claims, 15 Drawing Sheets

U.S. PATENT DOCUMENTS

| | | | |
|---|---|---|---|
| 4,066,268 A | 1/1978 | Borchard et al. | |
| 4,622,564 A | 11/1986 | Kaku et al. | |
| 4,899,224 A | 2/1990 | Ooba et al. | |
| 4,967,286 A | 10/1990 | Nomula et al. | |
| 5,126,995 A | 6/1992 | Nishizawa | |
| 5,182,741 A | 1/1993 | Maeda et al. | |
| 5,317,337 A | 5/1994 | Ewaldt | |
| 5,398,231 A | 3/1995 | Shin et al. | |
| 5,444,687 A | 8/1995 | Okumura | |
| 5,498,509 A | 3/1996 | Shin et al. | |
| 5,504,688 A | 4/1996 | Letourneau | |
| 5,518,325 A | 5/1996 | Kahle | |
| 5,608,717 A | 3/1997 | Ito et al. | |
| 5,608,718 A | 3/1997 | Schiewe | |
| 5,616,447 A | 4/1997 | Arioka | |
| 5,627,895 A | 5/1997 | Owaki | |
| 5,669,995 A | 9/1997 | Hong | |
| 5,675,570 A | 10/1997 | Ohira et al. | |
| 5,688,173 A | 11/1997 | Kitahara et al. | |
| 5,729,533 A | 3/1998 | Marquardt | |
| 5,745,457 A | 4/1998 | Hayashi et al. | |
| 5,748,607 A | 5/1998 | Ohira et al. | |
| 5,751,671 A | 5/1998 | Koike et al. | |
| 5,764,430 A | 6/1998 | Ottesen et al. | |
| 5,766,495 A | 6/1998 | Parette | |
| 5,781,221 A * | 7/1998 | Wen et al. | 347/232 |
| 5,846,131 A | 12/1998 | Kitahara | |
| 5,866,354 A | 2/1999 | Froman | |
| 5,869,420 A | 2/1999 | Naito | |
| 5,875,156 A | 2/1999 | Ito et al. | |
| 5,915,858 A | 6/1999 | Wen | |
| 5,949,752 A | 9/1999 | Glynn et al. | |
| 5,958,651 A | 9/1999 | van Hoof et al. | |
| 5,967,676 A | 10/1999 | Cutler et al. | |
| 5,997,976 A | 12/1999 | Mueller et al. | |
| 6,019,151 A | 2/2000 | Wen et al. | |
| 6,020,977 A | 2/2000 | Kim | |
| 6,026,066 A | 2/2000 | Maezawa | |
| 6,034,930 A | 3/2000 | Kitahara | |
| 6,074,031 A | 6/2000 | Kahle | |
| 6,102,800 A | 8/2000 | Kitahara et al. | |
| 6,104,677 A | 8/2000 | Kirihara et al. | |
| 6,109,324 A | 8/2000 | Bugner et al. | |
| 6,124,011 A | 9/2000 | Kern | |
| 6,154,240 A | 11/2000 | Hickman | |
| 6,160,789 A | 12/2000 | Abraham | |
| 6,202,550 B1 | 3/2001 | Lee et al. | |
| 6,264,295 B1 | 7/2001 | Bradshaw et al. | |
| 6,270,176 B1 | 8/2001 | Kahle | |
| 6,295,261 B1 | 9/2001 | Kim | |
| 6,310,838 B1 | 10/2001 | Heemskerk et al. | |
| 6,317,392 B1 | 11/2001 | Lee et al. | |
| 6,317,399 B1 | 11/2001 | Ohtani et al. | |
| 6,329,035 B1 | 12/2001 | Iwasaki et al. | |
| 6,384,929 B1 | 5/2002 | Miller | |
| 6,386,667 B1 | 5/2002 | Cariffe | |
| 6,403,191 B1 | 6/2002 | Casagrande | |
| 6,440,248 B1 | 8/2002 | Mueller | |
| 6,452,883 B2 | 9/2002 | Chan | |
| 6,469,969 B2 | 10/2002 | Carson et al. | |
| 6,501,718 B1 | 12/2002 | Ono et al. | |
| 6,507,557 B1 | 1/2003 | Ohno et al. | |
| 6,512,535 B1 | 1/2003 | Nagasaka et al. | |
| 6,532,034 B2 | 3/2003 | Hirotsune et al. | |
| 6,534,142 B1 | 3/2003 | Hummell et al. | |
| 6,552,971 B2 * | 4/2003 | Iida | 369/44.29 |
| 6,556,234 B1 | 4/2003 | Koyama | |
| 6,596,358 B1 | 7/2003 | Sakamoto et al. | |
| 6,654,324 B1 | 11/2003 | Huber et al. | |
| 6,771,297 B2 | 8/2004 | Bronson | |
| 6,778,205 B2 | 8/2004 | Anderson et al. | |
| 6,844,889 B2 | 1/2005 | Bronson | |
| 6,862,033 B2 | 3/2005 | McClellan | |
| 6,864,907 B2 | 3/2005 | Bronson | |
| 6,903,760 B2 | 6/2005 | McFarland et al. | |
| 7,015,939 B2 * | 3/2006 | Honda et al. | 347/225 |
| 2001/0021070 A1 * | 9/2001 | Ishii et al. | 359/719 |
| 2001/0026531 A1 | 10/2001 | Onodera et al. | |
| 2001/0040867 A1 | 11/2001 | Onodera et al. | |
| 2002/0046177 A1 | 4/2002 | Oshima et al. | |
| 2002/0048241 A1 | 4/2002 | Kumagai et al. | |
| 2002/0126617 A1 | 9/2002 | Emberty et al. | |
| 2003/0107959 A1 | 6/2003 | Norton et al. | |
| 2003/0108708 A1 | 6/2003 | Anderson et al. | |
| 2005/0281152 A1 * | 12/2005 | Honda et al. | 369/47.1 |
| 2005/0281181 A1 * | 12/2005 | Honda et al. | 369/275.1 |
| 2005/0281182 A1 * | 12/2005 | Honda et al. | 369/275.1 |
| 2005/0281183 A1 * | 12/2005 | Honda et al. | 369/275.1 |

FOREIGN PATENT DOCUMENTS

| | | |
|---|---|---|
| EP | 0 682 341 B1 | 11/1995 |
| EP | 0 762 407 B1 | 3/1997 |
| EP | 0771677 | 5/1997 |
| GB | 2 277 827 A | 11/1994 |
| JP | 58-100235 | 6/1983 |
| JP | 58-100235 A | 6/1983 |
| JP | 59-38932 | 3/1984 |
| JP | 62-241139 A | 10/1987 |
| JP | 63-102044 | 5/1988 |
| JP | 63-201944 | 8/1988 |
| JP | 3-71420 U | 7/1991 |
| JP | 05-073960 | 3/1993 |
| JP | 05-225570 | 9/1993 |
| JP | 6-36514 A | 2/1994 |
| JP | 8-77618 | 3/1996 |
| JP | 8-287526 | 11/1996 |
| JP | 08-327339 | 12/1996 |
| JP | 09-123606 | 5/1997 |
| JP | 9-123607 | 5/1997 |
| JP | 9-245371 | 9/1997 |
| JP | 9-265760 | 10/1997 |
| JP | 09-265760 | 10/1997 |
| JP | 9-2657660 A | 10/1997 |
| JP | 9-306144 | 11/1997 |
| JP | 09-306144 A | 11/1997 |
| JP | 302316/1998 | 11/1998 |
| JP | 10-320963 | 12/1998 |
| JP | 11-003543 | 1/1999 |
| JP | 110816/1999 | 1/1999 |
| JP | 11-96561 | 4/1999 |
| JP | 11-283356 | 10/1999 |
| JP | 11283356 A * | 10/1999 |
| JP | 2000-105947 | 4/2000 |
| JP | 2000-113516 | 4/2000 |
| JP | 2000-149334 A | 5/2000 |
| JP | 2000-155989 | 6/2000 |
| JP | 2000-173096 | 6/2000 |
| JP | 2000-173238 | 6/2000 |
| JP | 2000-242935 A | 9/2000 |
| JP | 2000-251387 | 9/2000 |
| JP | 2000-276777 A | 10/2000 |
| JP | 2000-292934 | 10/2000 |
| JP | 2002-216396 | 8/2002 |

OTHER PUBLICATIONS

Office Action in Japanese Patent Application No. 2005-277372 dated Feb. 12, 2008.

Office Action in Japanese Patent Application No. 2005-277450 dated Jan. 29, 2008.

Office Action for Japanese Patent Application No. 2005-277318 w/English translation dated Oct. 30, 2007 (four (4) pages).

Office Action for Japanese Patent Application No. 2005-277450 w/English translation dated Oct. 30, 2007 (four (4) pages).
Office Action for Japanese Patent Application No. 2005-277509 w/English translation dated Oct. 30, 2007 (four (4) pages).
Office Action for Japanese Patent Application No. 2005-277570 w/English translation dated Oct. 30, 2007 (four (4) pages).
Office Action for Japanese Patent Application No. 2005-277801 w/English translation dated Oct. 30, 2007 (four (4) pages).
Office Action in Japanese Patent Application No. 2005-277694 dated May 13, 2008.

* cited by examiner

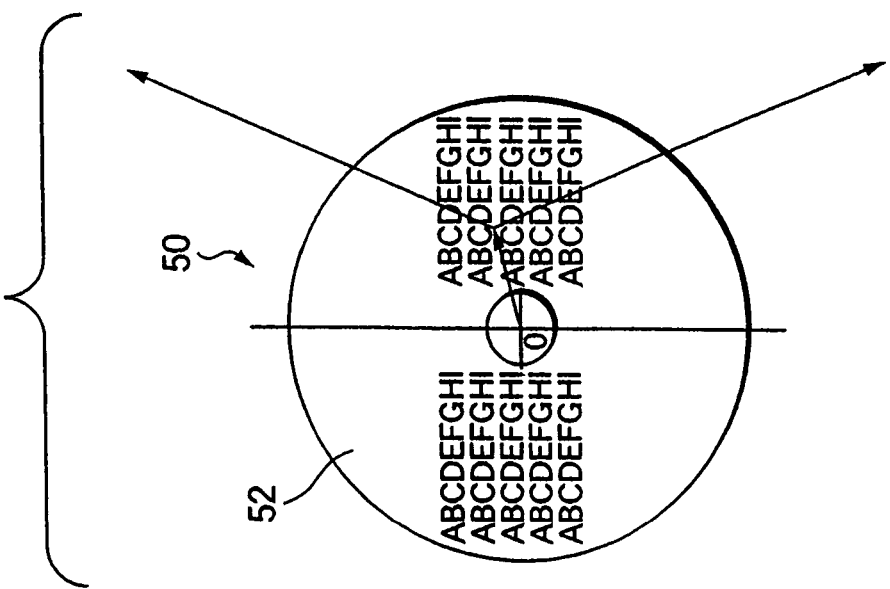
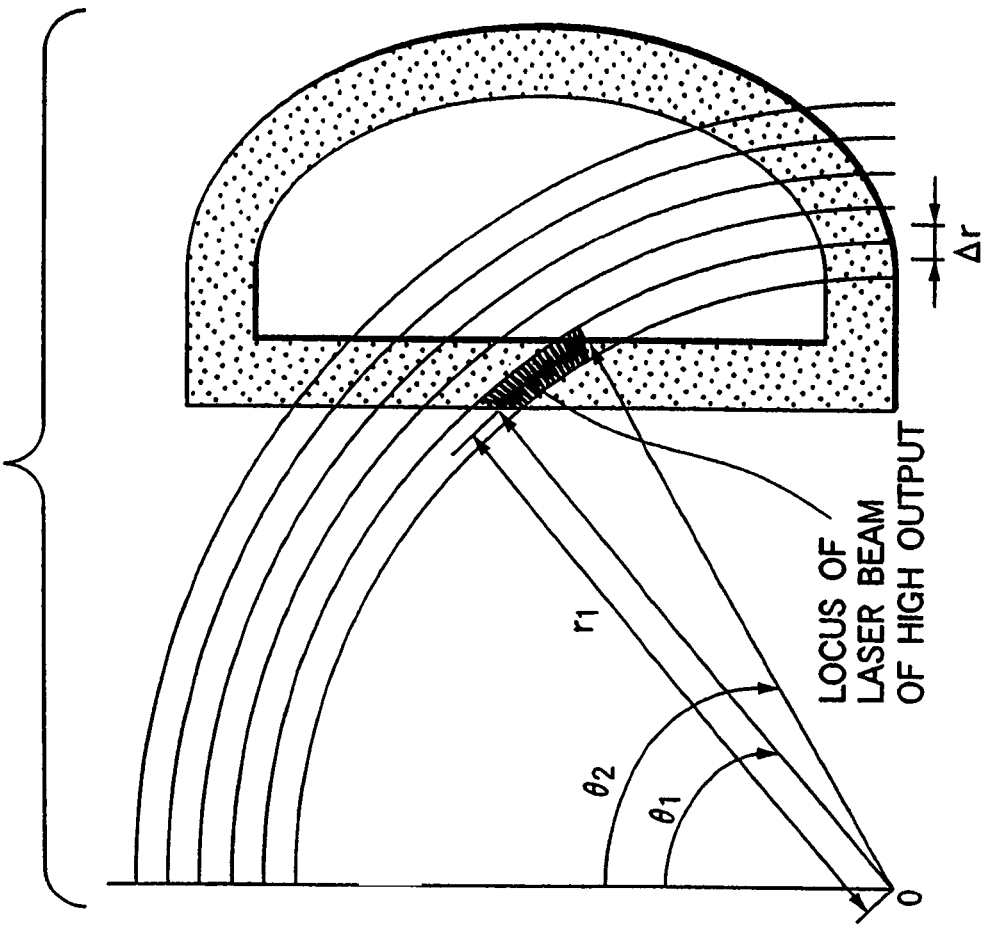

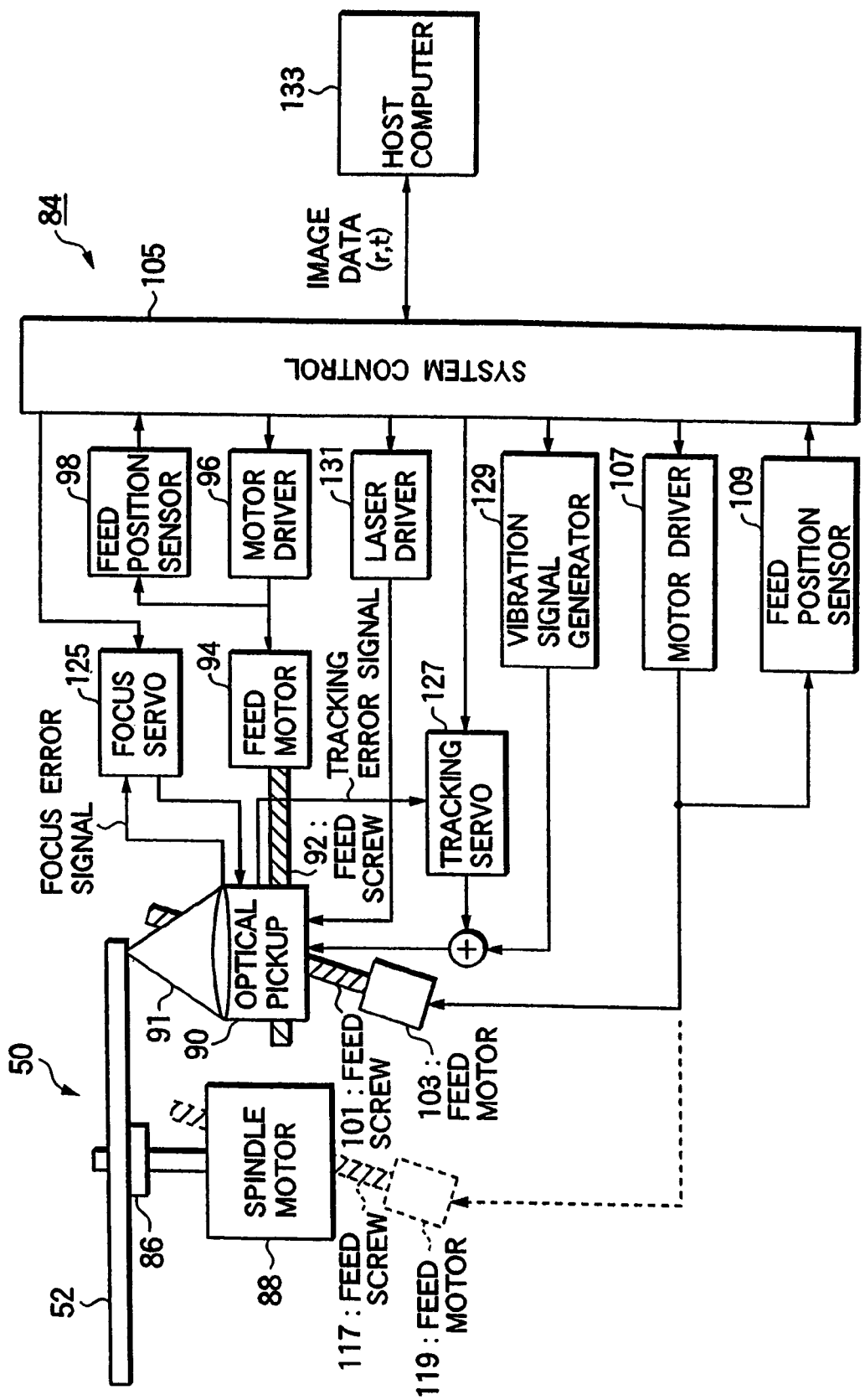

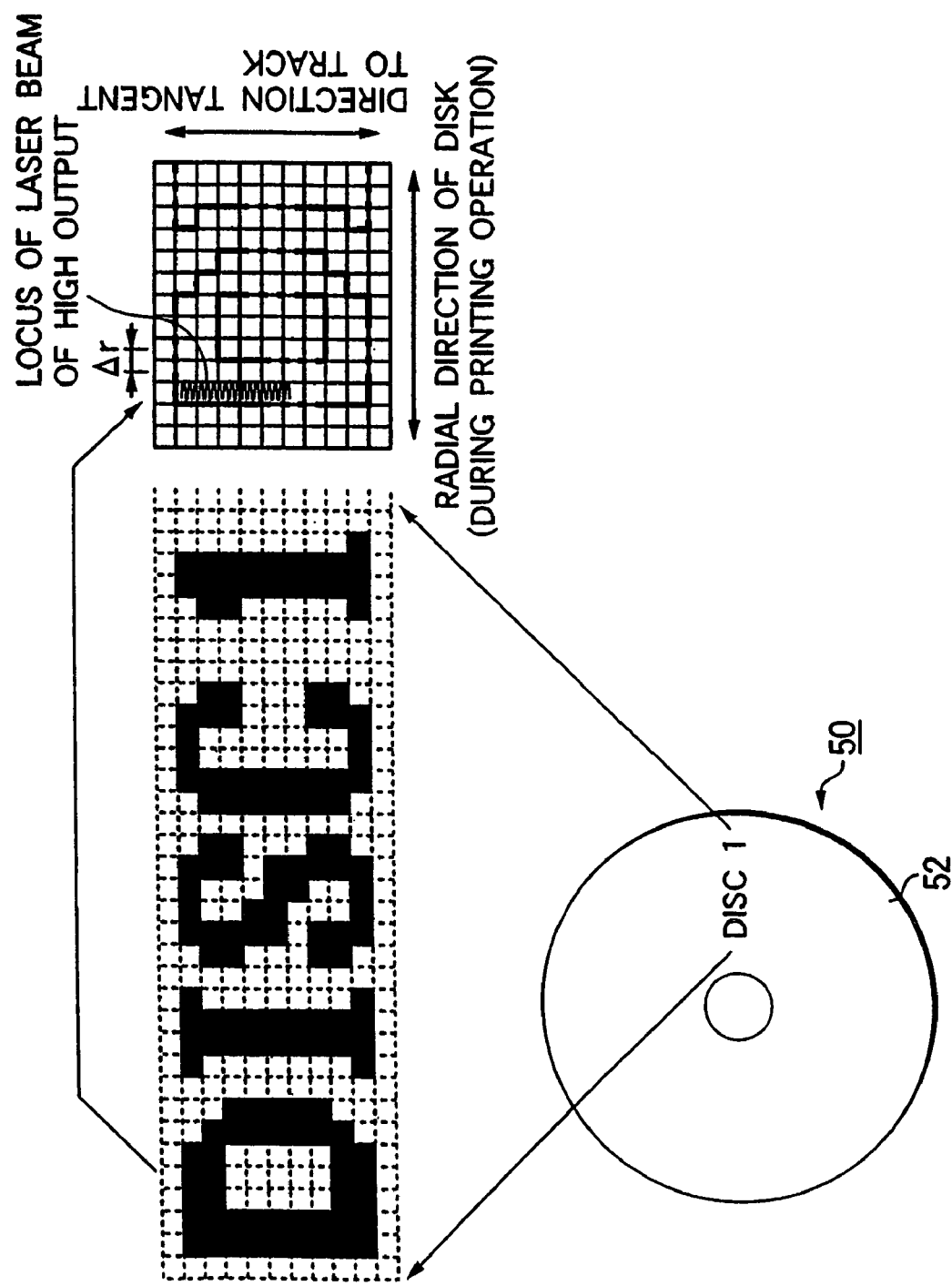

CONSTANT ANGULAR VELOCITY DISK LABEL PRINTING

CROSS REFERENCE TO RELATED APPLICATIONS

This application is a continuation of application Ser. No. 11/338,659, filed Jan. 25, 2006 now abandoned, which is a continuation of application Ser. No. 11/210,902, filed Aug. 25, 2005 (now U.S. Pat. No. 7,015,939), which is a continuation of application Ser. No. 10/053,238, filed Oct. 29, 2001 now U.S. Pat. No. 7,268,794, the entire disclosure of these applications is herein expressly incorporated by reference.

BACKGROUND OF THE INVENTION

The present invention relates to a method of printing a label provided on an optical disk, to an optical disk unit, and relates to an optical disk in which a label can be subjected to printing by utilization of a laser beam output from an optical disk unit.

In a recordable optical disk, information about contents recorded thereon (e.g., titles) is described on an optical disk by a user so that the recorded contents can be checked visually. In the case of a single-sided optical disk which is handled as a single disk without being housed in a cartridge, such as a CD-system optical disk i.e., a CD-R (CD recordable), a CD-RW (CD rewritable), etc. the information is usually written directly on a label surface of the optical disk with a pen. According to another method, information about recorded contents recorded are edited on a personal computer, and the contents are printed on a label with a printer. The label is then pasted to the label surface.

According to the method in which contents are written directly on the label surface of the disk, a recording layer is often damaged by a strong writing action effected by use of a stiff pencil. According to the method of printing a label with a printer, there is a necessity for using a printer.

SUMMARY OF THE INVENTION

The present invention has been conceived in light of the foregoing problem and aims at providing a method of forming an image on a label surface of an optical disk, an optical disk unit, and an optical disk, wherein an image is formed on a label surface of an optical disk by utilization of a laser beam output from an optical disk unit, thereby obviating a necessity for writing of an image performed with a pen or printing an image with a printer.

The present invention provides a method of forming an image on a label surface of an optical disk, the method comprising the steps of: forming a visible light characteristic changing layer in a position which can be viewed from a label surface side of an optical disk, the layer changing a characteristic of visible light having entered from the label surface side by exposure to a laser beam used for recording a signal and emitted from the part of the label surface; setting the optical disk on a turntable of an optical disk unit such that a label surface of the optical disk is oriented toward a direction in which a laser beam emitted from an optical pickup is to enter; relatively moving the optical disk and the laser beam along a plane of the optical disk; and modulating the laser beam, in synchronism with the mutual movement, into a specific characteristic in accordance with image data to be printed, such as characters or graphic images, and emitting the modulated laser beam onto the visible light characteristic changing layer from the part of the label surface, wherein a reflection characteristic of the visible light having entered the visible light characteristic changing layer is changed by means of exposure, thereby printing a corresponding image on the label surface. According to the label surface image formation method, a laser beam output from the optical disk unit can be emitted onto the visible light characteristic changing layer formed in an area which can be viewed from the part of a label surface of an optical disk, thereby changing the reflectivity, permeability, or light-scattering characteristic of the visible light. In this way, corresponding images, such as characters or graphic images, can be formed on the label surface, thereby obviating a necessity of writing images with a pen or printing images with a printer.

Under the method according to the present invention, the laser beam used for recording a signal can be a laser beam of predetermined power or higher. The optical pickup can be moved in a radial direction of the optical disk while the optical disk is being rotated. The optical disk can be made stationary, and the optical pickup is moved in a radial direction of the optical disk as well as in a direction which is orthogonal to the radial direction of the optical disk and is tangent to a track.

The present invention also provides an optical disk unit comprising: a relative movement mechanism for relatively moving an optical disk set on a turntable while a label surface is oriented in a direction in which a laser beam is to enter, and a laser beam emitted from an optical pickup along a plane of the optical disk; a laser modulation circuit for modulating a laser beam emitted from the optical pickup; and a circuit for controlling the relative movement mechanism and the laser modulation circuit, wherein the control circuit performs control operation so as to form an image on a visible light characteristic changing layer by controlling the relative movement mechanism to relatively move the optical disk and the laser beam and controlling the laser modulation circuit in accordance with image data, such as characters or graphic images, to be formed on a label surface of the optical disk, thereby modulating a laser beam output from the optical pickup on the basis of the image data, and thereby forming an image corresponding to the image data on the visible light characteristic changing layer, a characteristic of reflectivity, permeability or light scattering of the visible light is changed by the exposure of the laser beam, which can be viewed from the part of a label surface of the optical disk. The optical disk unit enables implementation of the label surface image formation method according to the present invention.

Preferably, the relative movement mechanism includes a rotary drive device for rotationally driving a turntable and a radial-direction feed drive device for moving the optical pickup in a radial direction of the optical disk; wherein the control circuit can control the rotary drive device and the radial-direction feed drive device, thereby controlling relative movement between the optical disk and the laser beam. In this case, the control circuit can drive the rotary drive device to a constant rotating speed, thereby driving the radial-direction feed drive device by a predetermined amount at each predetermined rotary position. Further, the optical disk unit can further comprise a circumferential-direction position sensor for detecting a circumferential position on the optical disk, and a radial-direction position sensor for detecting a radial position of the optical pickup on the optical disk; wherein the control circuit can perform a control operation for modulating a laser beam emitted from the optical pickup, in accordance with the position detected by the circumferential-direction position sensor and the radial-direction position sensor and with image data to be formed on a label surface of the optical disk, such as characters or graphic images. The positional information about image data can be expressed as coordinate data consisting of a combination of a circumferential position on an optical disk and a radial position on an optical disk. The circumferential-direction position sensor can comprise a frequency generator which is rotated by the rotary drive device to generate a signal of frequency corresponding to rotation, and a multiplier for multiplying the frequency of a signal generated by the frequency generator. The relative movement mechanism can comprise a radial-direction feed drive device for moving the optical pickup in a radial direction of the optical disk, and a track-tangential-direction feed drive device for moving the optical pickup in a direction which is perpendicular to the radial direction of movement and is tangent to a track of the optical disk; wherein the control circuit can control relative movement between the optical disk and the laser beam by controlling the radial-direction position sensor and the track-tangential-direction feed drive device while the turntable is left in a stationary state. The optical disk unit further comprises a circumferential-direction position sensor for detecting a circumferential position on the optical disk, and a track-tangential-direction position sensor for detecting a position which is orthogonal to the radial direction of movement and is tangent to a track of the optical disk; wherein the laser beam emitted from the optical pickup can be controlled in accordance with the position detected by the circumferential-direction position sensor and the track-tangential-direction position sensor and with image data to be formed on a label surface of the optical disk, such as characters or graphic images. The positional information about image data can be expressed as coordinate data consisting of a combination of a radial position on an optical disk and a position along a direction which is perpendicular to the radial direction of movement of the optical disk and is tangent to a track of the optical disk. Further, the control circuit performs relative movement between the optical disk and the laser beam by turning off a tracking servo and turning on/off a focus servo. The control circuit can perform a control operation for vibrating and driving a tracking actuator of the optical pickup while performing relative movement between the optical disk and the laser beam. The optical disk unit according to the present invention can be embodied in, for example, an optical disk unit for a single-side CD-type optical disk, such as a CD-R (CD-R recordable) and CD-RW (CD rewritable); or an optical disk recording device for an optical disk formed by laminating two substrates; for example, a DVD-type optical disk such as a DVD-R (DVD recordable) or DVD-RW (DVD rewritable).

The present invention also provides an optical disk comprising a visible light characteristic changing layer which changes a visible characteristic of a visible light by exposure to a laser beam having entered from a label surfaces and which is formed in a location capable of being viewed from the part of the label surface. The optical disk enables implementation of the label surface image formation method according to the present invention. Since the visible light characteristic changing layer is formed integrally on an optical disk, occurrence of vibration caused by mass eccentricity during high-speed rotation, and occurrence of failure caused by exfoliation of a label within a drive can be prevented, as compared with a label pasting method.

Preferably, the visible light characteristic changing layer can be embodied in a color-changing layer which undergoes fading, coloring, or changes in color or hue by exposure to the laser beam. Further, the color-changing layer can be embodied in a photosensitive or heat sensitive layer, or two layers construction. In case of the two layers construction, the two layers are fused or mixed together by exposure to the laser beam, thereby changing a visible-light characteristic. The optical disk can be constituted by sequentially forming, on a substrate, at least a recording layer, a reflection layer, and a protective layer; and the visible light characteristic changing layer can be formed between the reflection layer and the protective layer. An intermediate layer can be disposed between the reflection layer and the visible light characteristic changing layer, in order to improve, for example, adhesion between a reflection layer and a visible light characteristic changing layer, and to effect insulation control for the purpose of controlling heat conductivity contributing to changes in a characteristic of visible light or protecting data recorded on a recording surface of an optical disk, the reflection layer and the intermediate layer can be joined directly together, and the intermediate layer and the visible light characteristic changing layer can be joined directly together. The interface between the reflection layer and the protective layer can be formed so as to be a fine mixture of a part containing the visible light characteristic changing layer and a part which does not include the visible light characteristic changing layer and is joined directly to the reflection layer and to the protective layer. Since the optical disk has a part where the reflection layer and the protective layer are joined directly together, adhesion can be improved and there can be realized control of thermal conductivity attributable to changes in a visible light characteristic. Even when the visible light characteristic changing layer is translucence, the reflection layer can be partially viewed from the label surface side via the part where no visible light characteristic changing layer is present and the reflection layer and the protective layer are joined together directly. Focus can be readily achieved on the reflection layer at the time of formation of an image on the label surface. The structure in which there are finely mixed together a part containing the visible light characteristic changing layer and a part which does not include the visible light characteristic changing layer and is joined directly to the reflection layer and to the protective layer can be embodied in a structure in which the visible light characteristic changing layer is formed between the reflection layer and the protective layer in the form of a plurality of dots or a plurality of voids. The visible light characteristic changing layer can be constituted in the form of concentric fringes or linear stripes, rather than in the form of dots or voids. The optical disk according to the present invention can be embodied in, for example, an optical disk unit for a single-side CD-type optical disk, such as a CD-R (CD-R recordable) or CD-RW (CD rewritable); or an optical disk recording device for an optical disk formed by laminating two substrates; for example, a DVD-type optical disk such as a DVD-R (DVD recordable) or DVD-RW (DVD rewritable).

BRIEF DESCRIPTION OF THE DRAWINGS

FIGS. 11A and 11B are a plan view and an enlarged partial plan view showing an example of a print made on the label surface by means of the CD-R/RW drive shown in FIG. 6;

FIG. 13 is a system configuration block diagram showing another embodiment of the optical disk unit according to the present invention;

FIG. 16 is a plan view showing an example of a print product formed on the label surface by means of the CD-R/RW drive shown in FIG. 13.

DETAILED DESCRIPTION OF PREFERRED EMBODIMENTS

Figure 1:
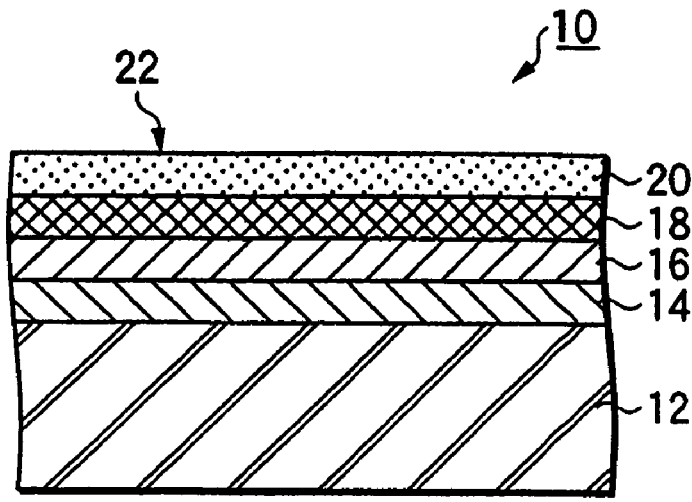
FIG. 1 is a partial cross section showing an embodiment of an optical disk according to the present invention.

Embodiments of the present invention will be described hereinafter. FIG. 1 is a partial cross section (the thickness of each layer differs from that of an actual layer, and a guide groove is omitted from the drawing) showing an optical disk according to the embodiment of present invention. The embodiment shows an example in which the present invention is applied to a CD-R disk. As to optical disk 10, a pigment layer (i.e., a recording layer) 14, a reflection layer 16, a visible light characteristic changing layer 18 and a protective layer 20 are sequentially formed on a single side of a transparent substrate so as to constitute the optical disk 10. The optical disk 10 is identical with an ordinary CD-R disk, except for provision of the visible light characteristic changing layer 18. The visible light characteristic changing layer 18 can be seen through a transparent protective layer 20 from a label surface 22. The reflectivity, permeability, or optical-scattering characteristic (i.e., reflectivity, permeability, and spectrum light scattering) in an area of the visible light characteristic changing layer 18 is changed when the area of the layer 18 is exposed to a laser beam having predetermined power or more from the label surface 22 side. The visible light characteristic changing layer 18 can be formed from a material layer (i.e., a color changing layer, a photosensitive layer, or a heat sensitive layer) which changes in color, such as a photo-sensitive material or heat-sensitive material, e.g., change from white to color (e.g., black) or from transparent to color (e.g., black). When the visible light characteristic changing layer 18 is formed from a photosensitive layer, there can be employed photosensitive material which is not photosensitized by the laser having power of less than 1 mW, but is photosensitized to discolor the photosensitive layer by a laser beam of 780 nm having power of 1 mW or more, with respect to a laser beam of 780 nm from the laser surface 22 side. When the visible light characteristic changing layer 18 is formed from a heat-sensitive layer, there can be employed heat sensitive material which is not sensitive to a heat of less than 100° C. but becomes sensitive to heat of 100° C. or higher to discolor the heat sensitive material. Further, the color-changing layer may be provided as the visible light characteristic changing layers. The color-changing layer is formed from two layers which are fused or mixed together by being exposed to the laser beam, thereby changing a visible-light characteristic. Since the laser beam for recording and playing the back data of the optical disk 10 is entered from the substrate 12 side and so that the laser beam is substantially cut off by the reflection layer 16. Therefore, the visible light characteristic changing layer 18 does not cause any change in the visible-light characteristic of the laser beam.

Figure 2:
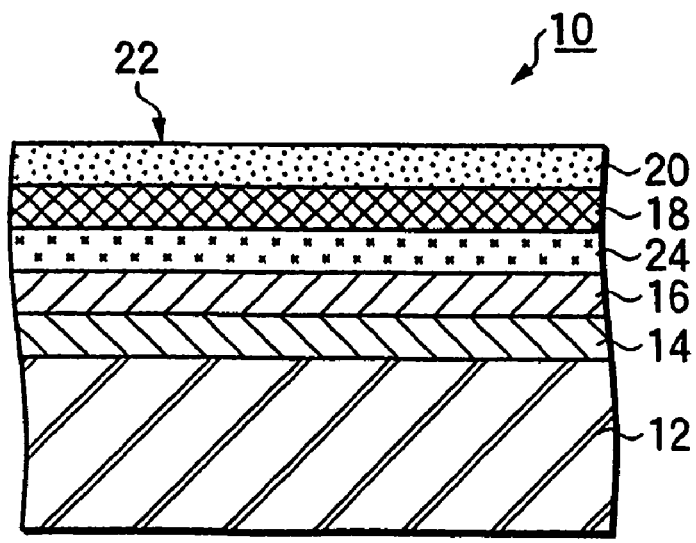
FIG. 2 is a partial cross section showing a modification of the optical disk shown in FIG. 1.
Figure 3:
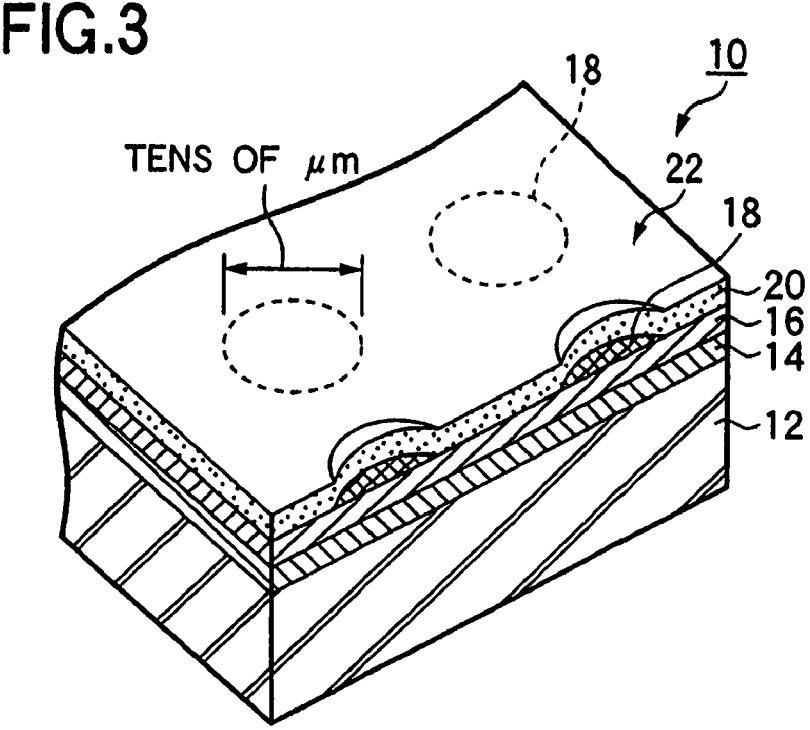
FIG. 3 is a partial cross section showing another modification of the optical disk shown in FIG. 1.

As shown in FIG. 2, an intermediate layer 24 can be provided between the reflection layer 16 and the visible light characteristic changing layer 18. The intermediate layer 24 can improve adhesion between a reflection layer and a visible light characteristic changing layer, control heat conductivity contributing to changes in a characteristic of visible light, and control heat insulating property to protect data recorded on a recording surface of an optical disk. The reflection layer and the intermediate layer can be joined directly together, and the intermediate layer and the visible light characteristic changing layer can be joined directly together. As shown in FIG. 3, in place of the intermediate layer 24, the visible light characteristic changing layer 18 is formed into a structure having a plurality of minute dots (e.g., each assuming a circular shape having a diameter of tens of micrometers or a non-circular shape of similar size), through use of, e.g., a film transfer technique. Alternatively, in place of a plurality of minute pores, the visible light characteristic changing layer 18 can be formed into a porous structure having a plurality of minute pores 26. In a case where the visible light characteristic changing layer 18 is formed into the structure having dots such as shown in FIG. 3, the reflection layer 16 and the protective layer 20 are joined together directly outside the dots. In a case where the visible light characteristic changing layer 18 is formed into the structure having pores such as that shown in FIG. 4, the reflection layer 16 and the protective layer 20 are directly joined together within the pores. As a result, there can be achieved good adhesion, and heat insulation control can be performed for the purpose of attaining the object. Even when the visible light characteristic changing layer 18 is translucence, the reflection layer 16 can be partially seen from the part of the label surface 22, through an area where no visible light characteristic changing layer 18 is present and at which the reflection layer 16 and the protective layer 20 are joined together directly. At the time of printing of the label surface 22, focusing on the reflection layer 16 can be achieved readily. The visible light characteristic changing layer 18 can be made into a structure having concentric fringes or linear stripes.

Figure 19:
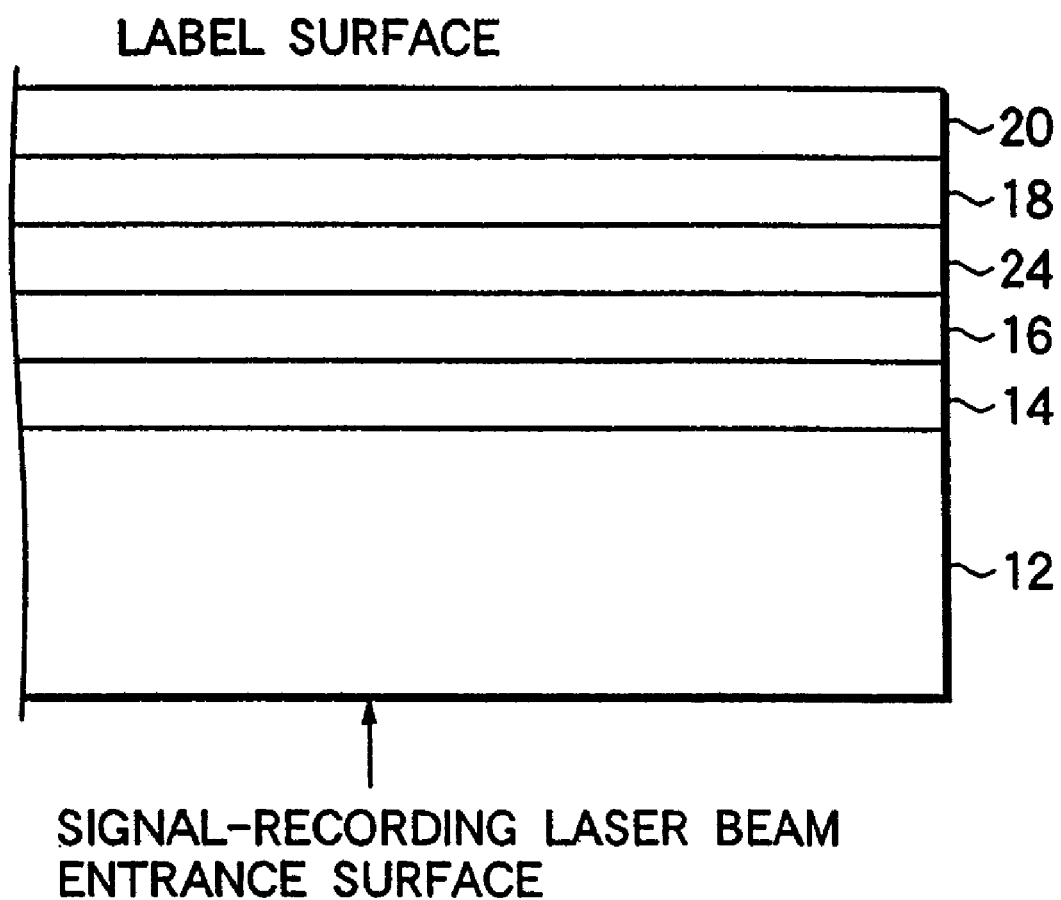
FIG. 19 is a partial cross section showing another modification of the optical disk shown in FIG. 1.

As shown in FIG. 19, a light scattering layer 24 (a translucence intermediate layer) may be provided between the visible light characteristic changing layer 18 and the reflection layer 16. By providing the translucence intermediate layer 24, light, which passes through the visible light characteristic changing layer 18 and is reflected by the reflection layer 16, is not directly emitted from the surface of the optical disk. That is, the light, which passes through the visible light characteristic changing layer 18, is scattered by the translucence intermediate layer 24. Therefore, light from the optical disk can be controlled by adjusting the translucence intermediate layer 24, so that the various type of images can be formed on the surface of the optical disk as label.

Figure 4:
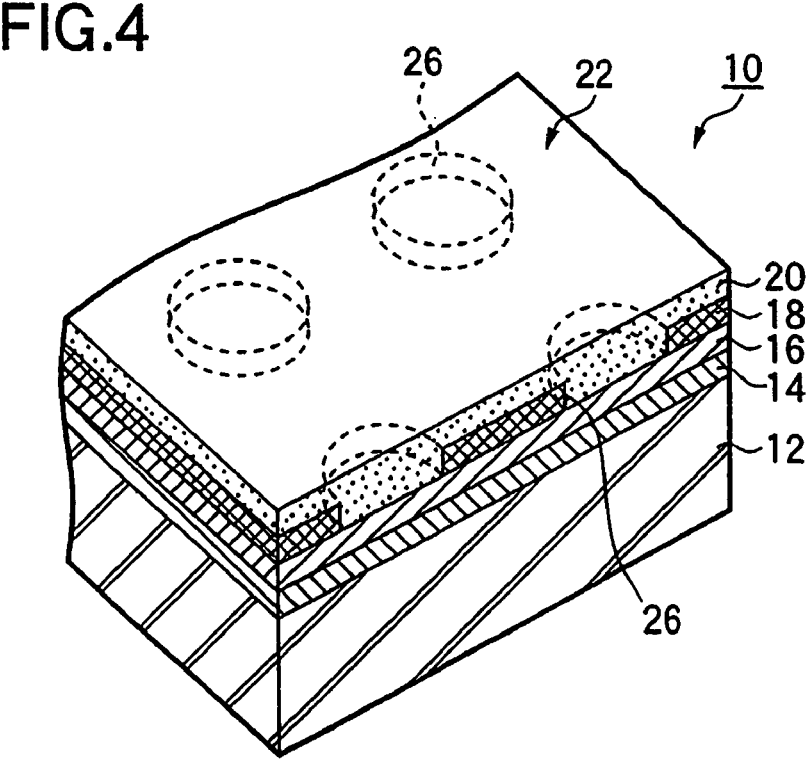
FIG. 4 is a partial cross section showing yet another modification of the optical disk shown in FIG. 1.
Figure 5:
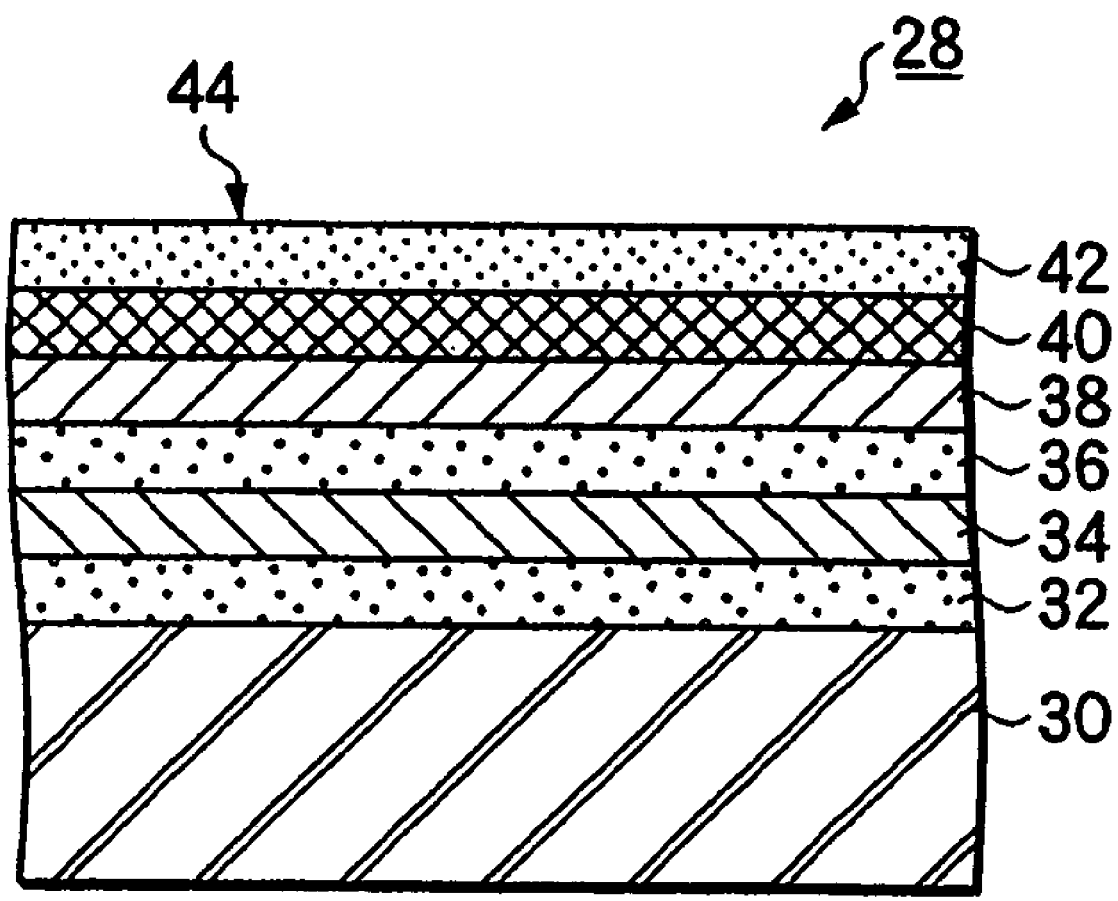
FIG. 5 is a partial cross section showing another embodiment of the optical disk according to the present invention.

FIG. 5 is a partial cross section (the thickness of each layer differs from that of an actual layer, and a guide groove is omitted from the drawing) showing another embodiment of the optical disk according to the present invention. This embodiment is an example in which the present invention is applied to a CD-RW disk. As to an optical disk 28, a dielectric layer 32, a recording layer 34, a dielectric layer 36, a reflection layer 38, a visible light characteristic changing layer 40, and a protective layer 42 are sequentially formed on a single of a transparent substrate 30 made of, for example, polycarbonate so as to constitute the optical disk 28. The optical disk 28 is identical with an ordinary CD-RW disk, except for provision of the visible light characteristic changing layer 40. The visible light characteristic changing layer 40 can be seen from a label surface 44 side through a transparent protective layer 42. The visible light characteristic changing layer 40 can be constituted in the same manner as in the visible light characteristic changing layer 18 shown in FIG. 1. As in the case of the optical disk 10 shown in FIG. 2, an intermediate layer can be interposed between the reflection layer 38 and the protective layer 42 for the purpose set forth. Further, the visible light characteristic changing layer 40 can be formed into a structure having a plurality of minute spots, as in the visible light characteristic changing layer 18 shown in FIG. 3. Alternatively, the visible light characteristic changing layer 40 can be formed into a porous structure having a plurality of minute pores, as shown in FIG. 4. As another alternative, the visible light characteristic changing layer 40 can be formed into a structure having concentric fringes or a structure having linear stripes.

Figure 17:
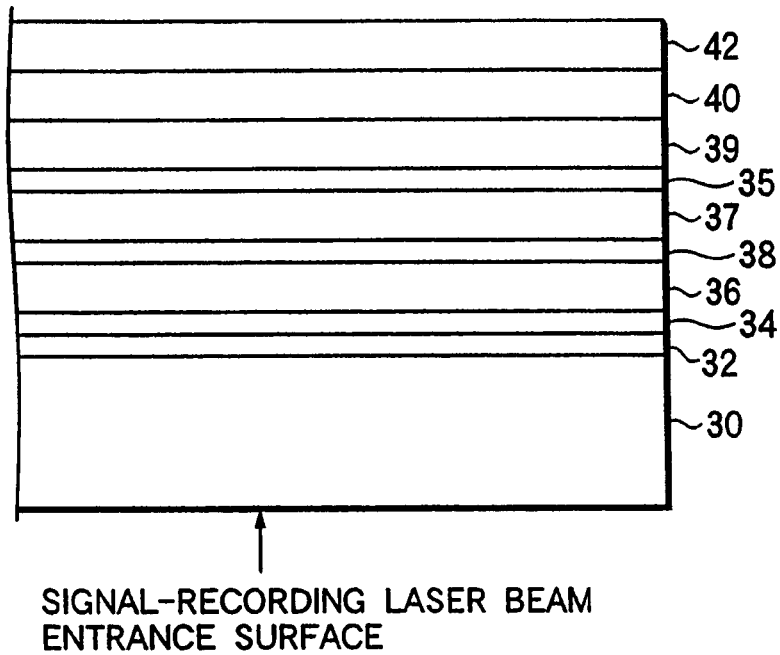
FIG. 17 is a partial cross section showing another modification of the optical disk shown in FIG. 1.

FIG. 17 shows a partial cross section (the thickness of each layer differs from that of an actual layers, and a guide groove is omitted from the drawing) showing another embodiment of the optical disk according to the present invention. In this embodiment, a reflection layer for data recording and a reflection layer for imaging a label are separately provided in the optical disk. That is, a second reflection layer 35 is formed between an intermediate layer 35 and a buffer layer 37 (separation layer) as shown in FIG. 17. The second reflection layer 35 is made of metal or derivative reflection material. Remain portion of the optical disk shown in FIG. 17 is identical to the optical disk shown in FIG. 5. In this embodiment, since the reflection layers 35 and 38 are separately provided in the optical disk, mutual influence of recording data and printing label to the visible light characteristic changing layer 40 and the recording layer 34 is reduced. Therefore, the influence on formation of an image on the label surface is certainly eliminated.

Figure 18:
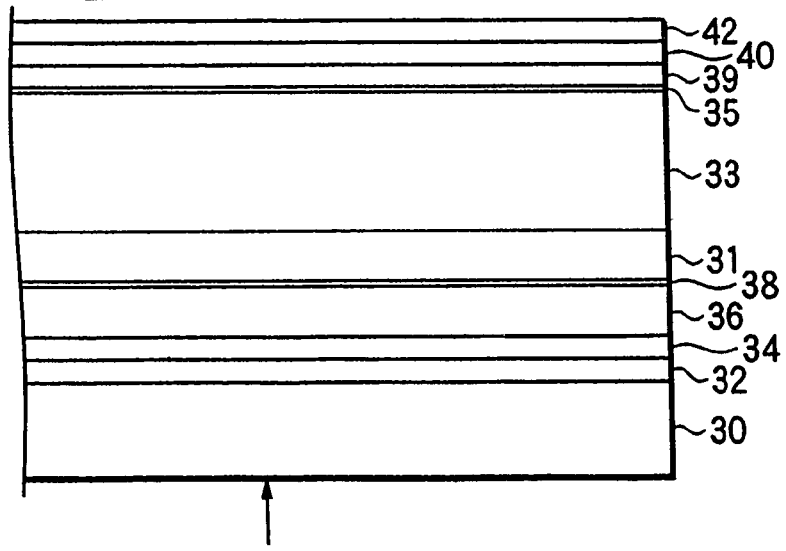
FIG. 18 is a partial cross section showing another modification of the optical disk shown in FIG. 1.

FIG. 18 shows a partial cross section (thickness of each layer differs from that of an actual layers, and a guide groove is omitted from the drawing) showing another embodiment of the optical disk according to the present invention. This embodiment is an example in which the present invention is applied to an optical disk comprising two substrates adhered with other, such as a DVD (Digital video Disk). The optical disk in this embodiment is constituted as follows: a dielectric layer 32, a recording layer 34, a dielectric layer 36 and a first reflection layer 38 are sequentially formed on a first transparent substrate; a second reflection layer 35 made of metal or derivative reflection material, a translucence intermediate layer 39 (a light scattering layer), a visible light characteristic changing layer 40 and a protective layer 42 are sequentially formed on a second substrate 33; and the second substrate 33 is built on the first substrate 30 through a laminating adhesive layer 31 as shown in FIG. 18. In case of DVD, each substrate has a thickness of 0.6 mm and is laminated each other, so that sum of thickness including a recording layer is 1.2 mm.

Figure 6:
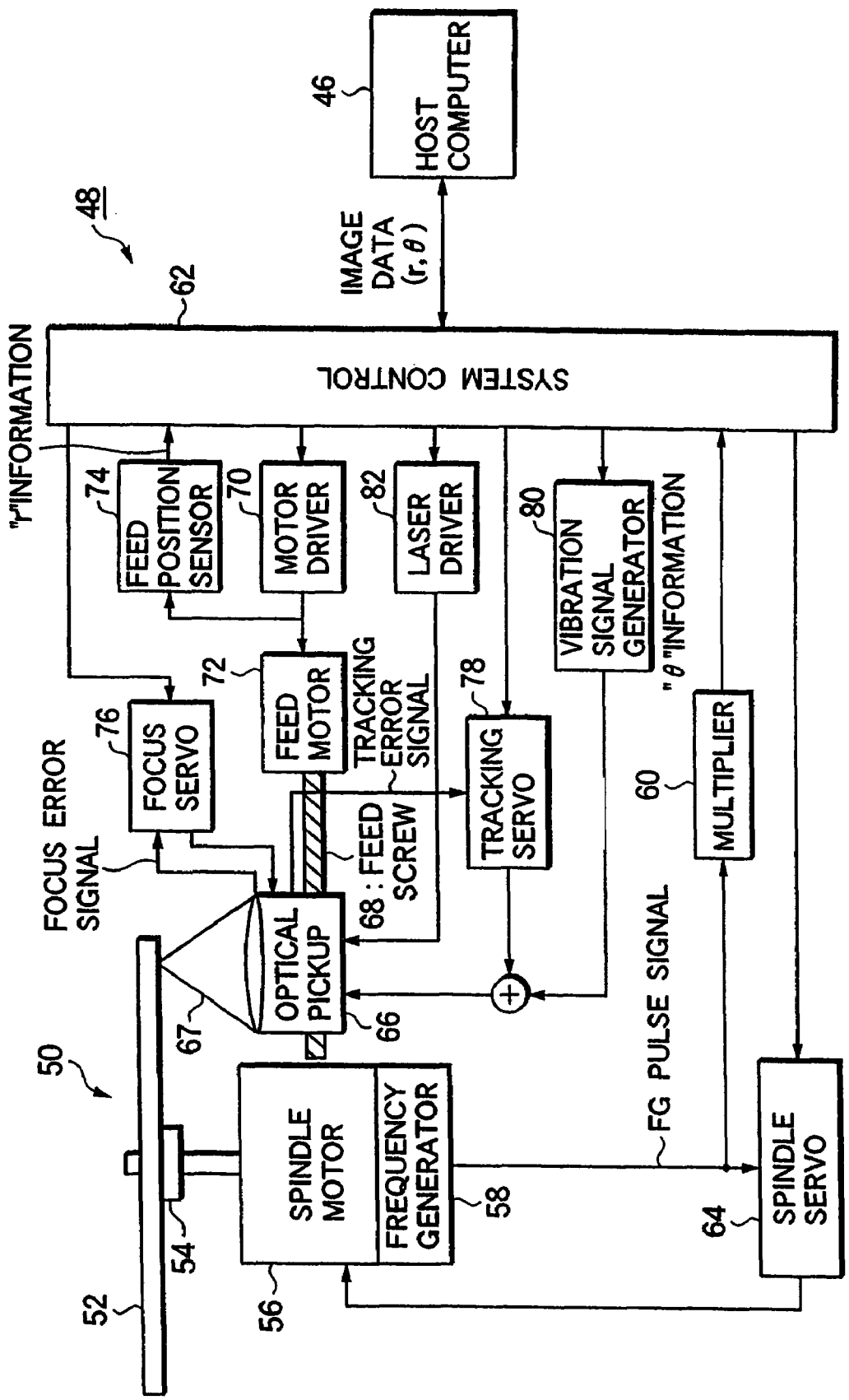
FIG. 6 is a system configuration block diagram showing an embodiment of an optical disk unit according to the present invention.

FIG. 6 shows an embodiment of the optical disk unit according to the present invention (showing only the portions of the unit pertaining to printing of a label surface). The optical disk unit is configured as a CD-R/RW drive (an optical disk drive which enables recording and reproduction of data on and from a CD-R disk and a CD-RW disk) used with connection with a host computer 46, such as a personal computer. An optical disk 50 according to the present invention (the CD-R disk shown in FIGS. 1 through 4 or the CD-RW disk 28 shown in FIG. 5, etc.) is placed on a turn-table 54 while being inverted (i.e., a label surface 52 is turned down) and the optical disk 50 is driven to be rotated. A frequency generator (FG) 58 is directly connected to a rotary shaft of a spindle motor 56. The frequency generator 58 generates a pulse signal (FG pulse) for each turning angle, the turning angle being determined by dividing one rotation of the spindle motor 56 by a predetermined integer. The FG pulse signal is multiplied by a predetermined number by a multiplier 60 constituted by a PLL circuit. The thus-multiplied FG pulse is input to a system control circuit (CPU) 62, where the signal is used for detecting a peripheral position. At the time of printing of a label surface, a spindle servo circuit 64 controls, on the basis of the FG pulse signal, the spindle motor 56 so as to rotate constantly at a rotating speed instructed by the system control circuit 62.

An optical pickup 66 is provided at a position under the optical disk 50 for executing recording and reproduction of data and printing of a label. The optical pickup 66 is supported by a feed screw 68 so as to be able to move in the radial direction of the optical disk 50. A feed motor 72 is driven by a motor driver 70 in accordance with an instruction output from the system control circuit 62 so as to rotate the feed screw 68 so that the optical pickup 66 is moved in the radial direction of the optical disk 50. A feed position sensor 74, such as a linear scale, detects the radial position of the optical pickup 66 on the optical disk 50. In accordance with an instruction output from the system control circuit 62, a focus servo circuit 76 actuates a focus actuator of the optical pickup 66 on the basis of a focus error signal, thus executing focus control operation. At the time of printing a label, the focus servo circuit 76 is turned on. At the time of recording or reproduction of data, a tracking servo circuit 78 actuates a tracking actuator of the optical pickup 66 on the basis of a tracking error signal in accordance with the instruction output from the system control circuit 62, thus executing tracking control operation. At the time of printing a label, the tracking servo circuit 78 is turned off. At the time of printing a label, a vibration signal generation circuit 80 generates a predetermined vibration signal in accordance with the instruction output from the system control circuit 62, and supplies the vibration signal to the tracking actuator. Accordingly, an object lens of the optical pickup 66 is vibrated in the radial direction of the optical disk 50 to thereby bridge a gap between the areas circularly scanned by a laser beam, as a result of which there is obtained a print product having no gaps.

The laser driver 82 drives a laser diode of the optical pickup 66 to emit a laser beam onto the optical disk 50 in accordance with the instruction output from the system control circuit 62, thereby executing recording/reproduction of data or printing a label. At the time of recording of data, the laser diode outputs a laser beam of recording power modulated by a recording signal. At the time of reproduction of data, the laser diode outputs a laser beam of fixed reproduction power. At the time of printing label, the laser diode outputs a laser beam modulated based on image data pertaining to characters or graphic images to be printed (i.e., a laser beam has high power so as to cause changes in the visible light characteristic changing layer in an area to be printed and a laser beam has low power so as not to cause changes in the visible light characteristic changing layer in an area not to be printed). At the time of printing a label, the host computer 46 transmits, to a CD-R/RW drive 48, image data, which edited by a user and to be printed, pertaining to characters or graphic images. The image data is constituted by data (e.g., data which specify a print segment represented by an angle θ for each radial position "r" at a predetermined pitch Δr) represented by coordinates (r, θ), the coordinates corresponding to a combination of a radial position "r" of an optical disk (a distance from a rotation center) and a circumferential position θ (a circumferential angle relative to an appropriate reference position).

Process of printing data on a label surface of the optical disk 50 by the CD-R/RW drive 48 shown in FIG. 6 is performed in the manner described below.

(1) The optical disk 50 is set on the turntable 54 while being inverted in case of recording data or reproducing, i.e. the optical disk 50 is set so as to face the surface of the optical disk 50, which the label is to be printed, to the optical pick up 66.

(2) A user edits, on a display of the host computer 46, characters or a graphic image such as a picture to be printed. The host computer 46 converts the thus-edited image into image data.

(3) The user instructs to start printing operation on the host computer 46.

(4) The spindle servo circuit 64 subjects the spindle motor 56 to CAV (constant rotating speed) control so that the pulse generated by the frequency generator 58 is to be a fixed frequency instructed by the system control circuit 62.

(5) The optical pickup 66 is positioned at a predetermined radial reference position at the inner radius of the optical disk 50.

(6) The laser driver 82 drives the laser diode so that the laser power of a laser diode of the optical pickup 66 is to be a predetermined low output instructed by the system control circuit 62 (a value of which enables focus control operation without involvement of occurrence of changes in the visible light characteristic changing layer: e.g., a value of 1 mW or less).

(7) The focus servo circuit 76 is turned on in accordance with the instruction output from the system control circuit 62. Then, the focus servo circuit 76 executes focus servo operation so that the laser beam 67 forms the minimum spot on the reflection layer. Here, the tracking servo circuit 78 remains off, and no tracking servo operation is performed.

Figure 7:
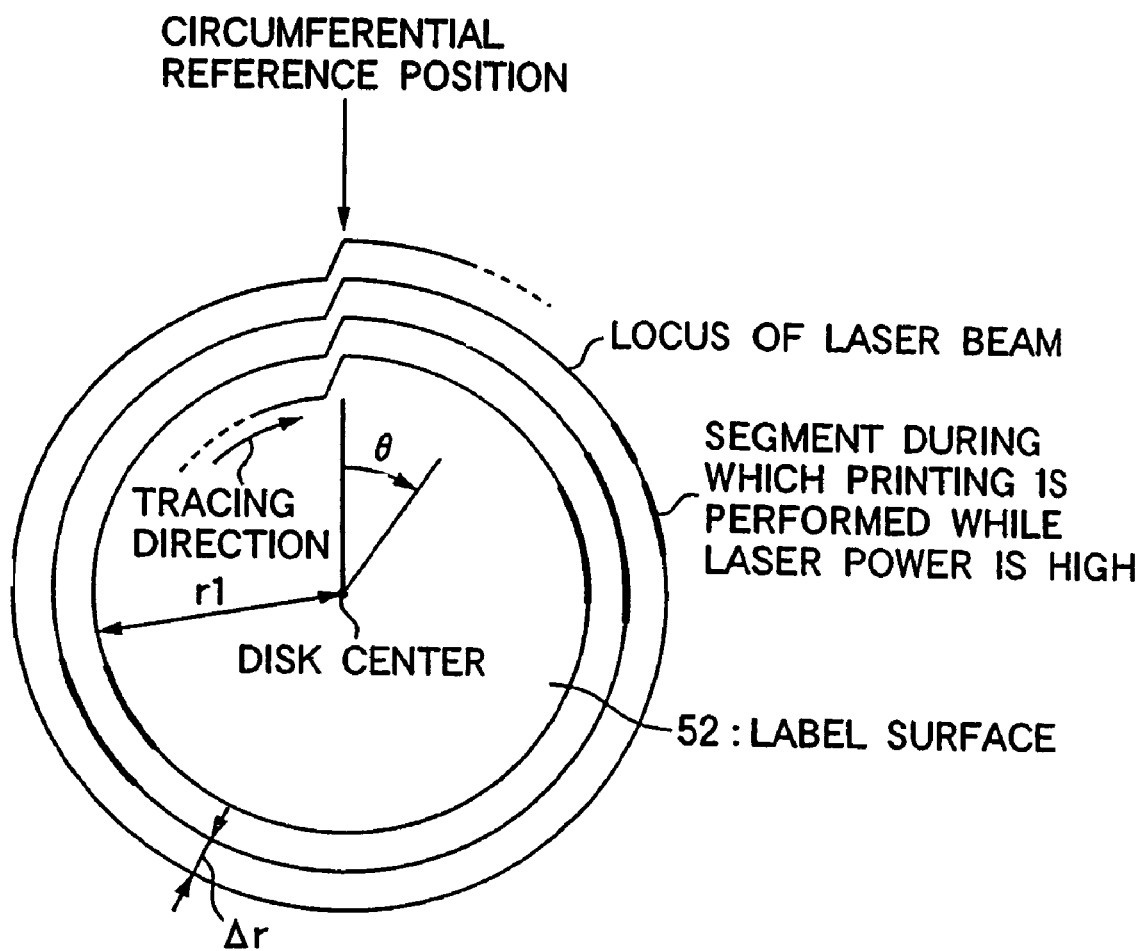
FIG. 7 is a plan view showing the locus of movement of a laser beam on a label surface stemming from an operation for subjecting the label surface to printing through use of a CD-R/RW drive shown in FIG. 6.
Figure 8:
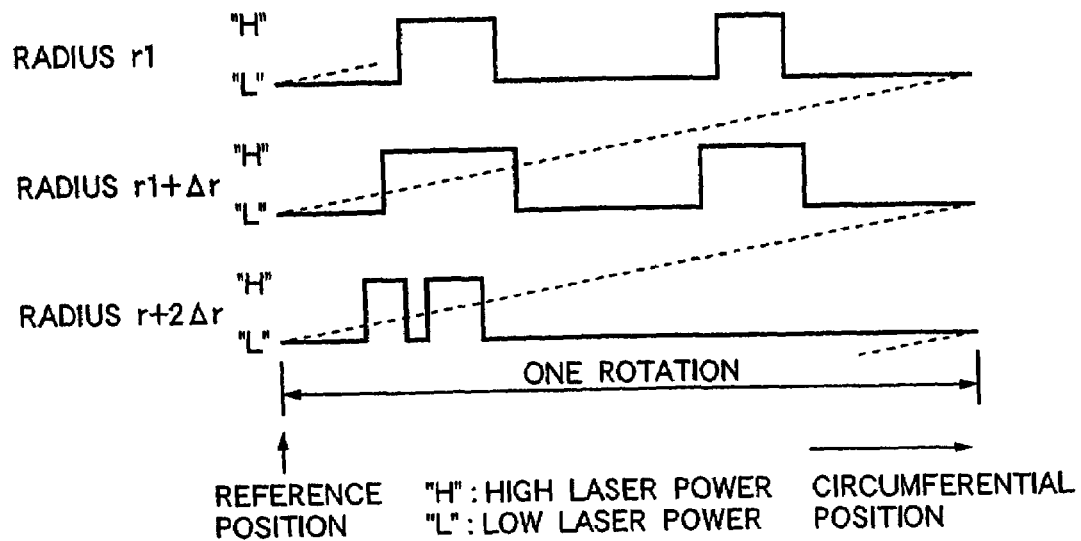
FIG. 8 is a timing chart showing changes in laser power which arise during the course of the printing operation shown in FIG. 7.

(8) Through the foregoing operations, preparation for printing is made, and printing is commenced in accordance with the instruction output from the system control circuit 62. That is, the system control circuit 62 receives image data from the host computer 46, then, drives the feed motor 72 to position the optical pickup 66 in a radial position at the inner radius of the optical disk 50, where a first print location is present. While appropriate timing based on the FG pulse signal (or a detection timing for a sensor additionally provided for detecting a reference circumferential position) is taken as a circumferential reference position, a circumferential position 0 is detected by counting a pulse signal output from the multiplier 60 is counted. With respect to the radial position on the disk, laser power is switched to a predetermined high output (a value at which changes arise in the visible light characteristic changing layer; for example, a value of 1 mW or more) in each circumferential print position instructed on the basis of image data. As a result, changes (i.e., discoloration) arise in the reflection characteristic changing layer at the location exposed to the laser beam of high output power, thereby performing printing operation. When the optical disk 50 returns to the circumferential reference position after having effected one rotation, the feed motor 62 is actuated so as to move the optical pickup 66 toward an outer circumference at a predetermined pitch Δr, and then, with respect to the radial position on the disk, laser power is switched to a predetermined high output in each circumferential print position instructed on the basis of image data. This printing operation is repeated to print so that the optical pickup 66 is sequentially moved toward the outer circumference at the predetermined pitch Δr every one rotation. FIG. 7 shows the locus of movement of the laser beam over the label surface 52 of the optical disk 50 through the printing operation. In the area designated with thick lines, the laser power of the laser beam is switched to high power, thereby performing printing operation. FIG. 8 shows variations in the laser power of the laser beam when the printing operation shown in FIG. 7 is performed.

Figure 9:
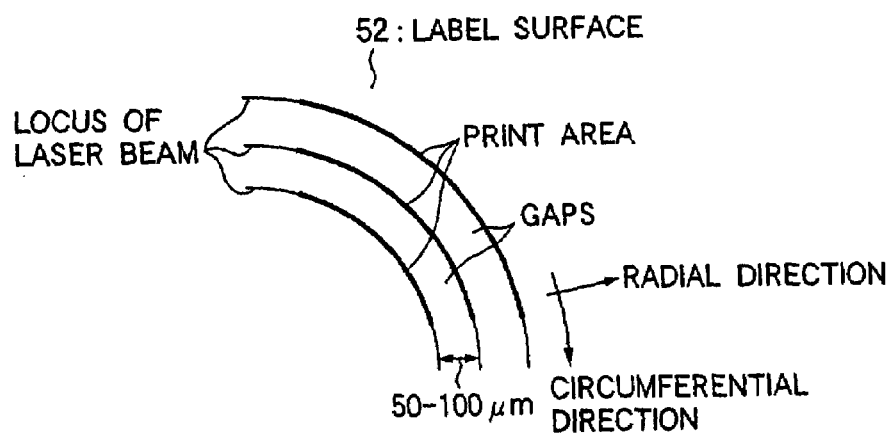
FIG. 9 is a plan view showing the locus of movement of a laser beam over a label surface arising when printing is effected without vibrating the laser beam in a radial direction of the optical disk.
Figure 10:
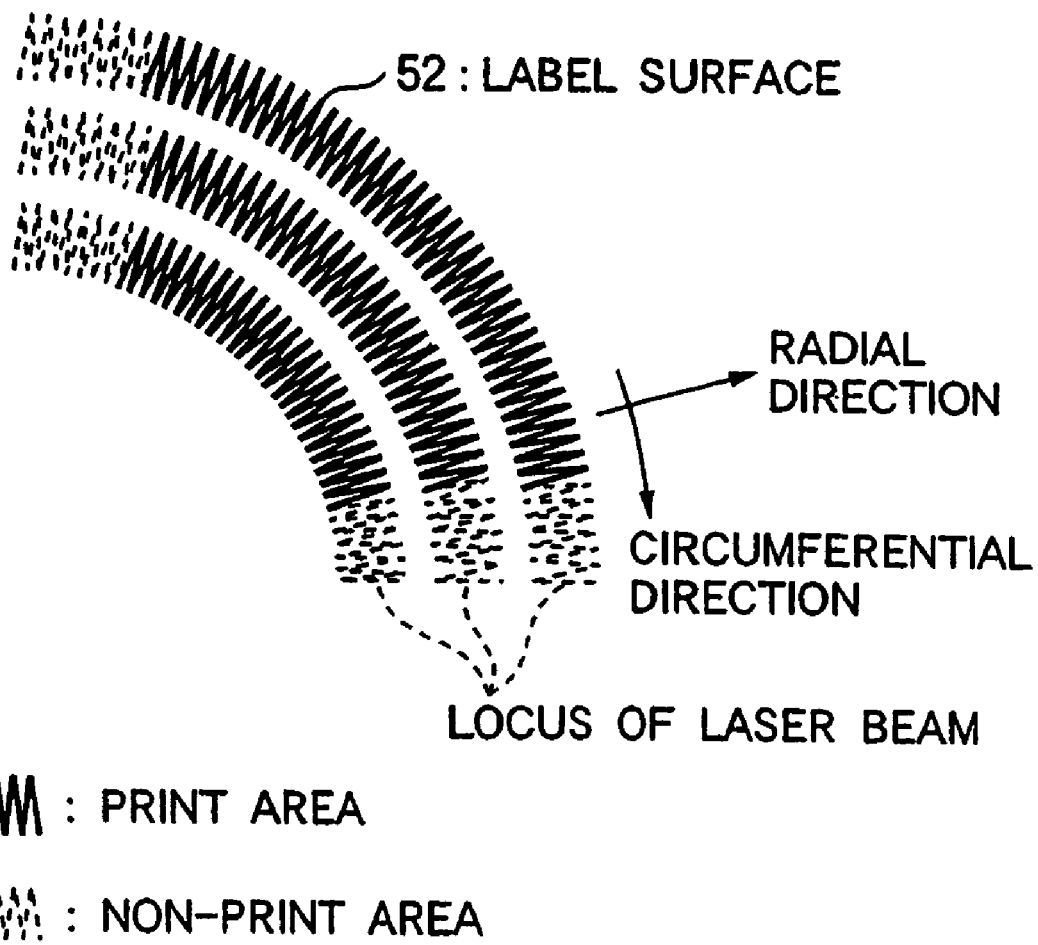
FIG. 10 is a plan view showing the locus of movement of a laser beam over a label surface arising when printing is performed while vibrating the laser beam in a radial direction of the optical disk.

Scanning is not performed at radial positions where there is no print area, and, the optical pickup 66 moves to a radial position where the next print area is present by passing through the radial position having no print area, and printing is performed. If the pitch Δr is large, an image which is originally to be printed without interruption in the radial direction is printed with gaps, as shown in FIG. 9. In contrast, if the pitch Δr is made small, gaps can be made unnoticeable. However, the number of rotations required for printing data on the entire label surface is increased, and printing involves consumption of time. For this reason, the CD-R/RW drive 48 drives a tracking actuator with a vibration signal (e.g., a sinusoidal signal or triangular signal) generated by the vibration signal generation circuit 80 during a printing operation, thereby vibrating the objective lens in the radial direction of the optical disk 50. As shown in FIG. 10, the laser beam is vibrated in the radial direction of the optical disk 50, thereby enabling a printing operation without gaps (or with occurrence of small gaps) even at a comparatively large pitch Δr. The frequency of the vibration signal can be set to, e.g., several kilohertz or thereabouts. Further, the pitch Δr can be set to, e.g., 50 to 100 μm or thereabouts.

Figure 12A:
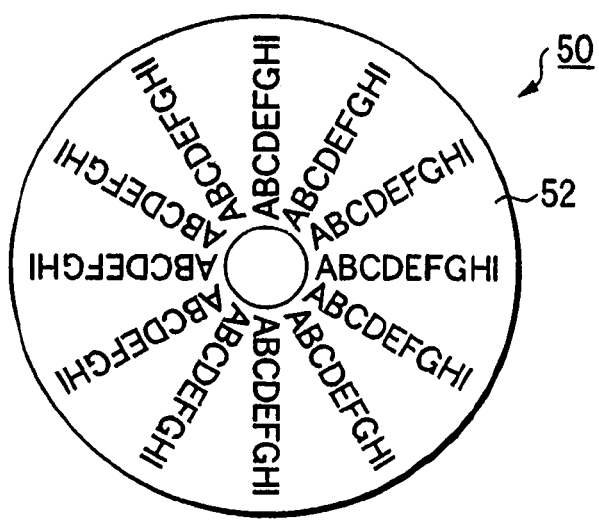
FIGS. 12A to 12C are plans view showing another example of a print made on the label surface by means of the CD-R/RW drive shown in FIG. 6.
Figure 12B:
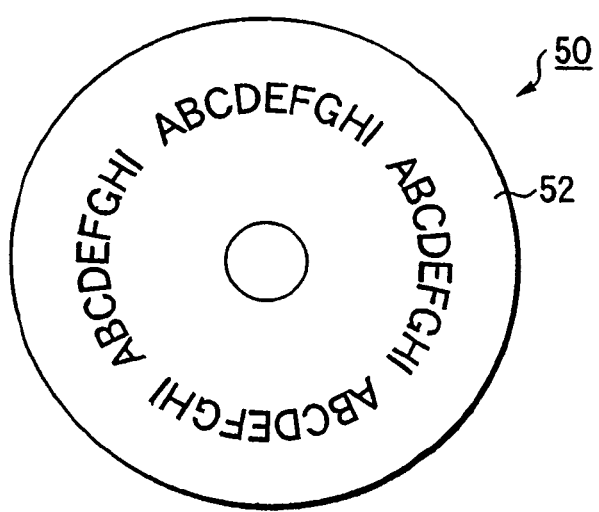
Figure 12C:
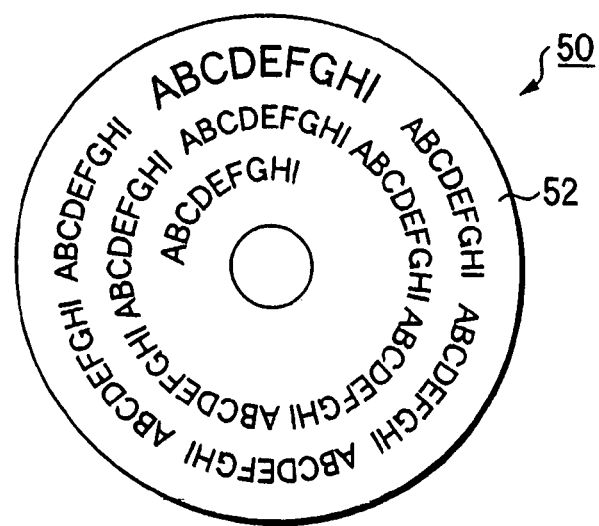

FIG. 11A shows a practical example of a print made on the label surface 52 by the CD-R/RW drive 48. FIG. 11B shows a partial enlarged view showing the locus of movement of a laser beam used during printing of the print example. The drawing shows that, when scanning in a radial position r1 is performed, the laser power of the laser beam is increased within an angular segment from θ1 to θ2. FIGS. 12A through 12C show other examples of print products made on the label surface 52 by the CD-R/RW drive 48. Arbitrary character information, such as disk titles, music titles, the names of artists, or pictures can be printed.

FIG. 13 shows another embodiment of the optical disk unit according to the present invention (showing only the elements contributing to printing of a label surface). In a CD-R/RW drive 84, the optical disk 50 (the CD-R disk 10 shown in FIG. 10 or the CD-RW disk 28 shown in FIG. 5) according to the present invention is set on a turntable 86 while being inverted (i.e., while the label surface 52 is turned down). At the time of printing operation, the spindle motor 88 is not driven. An optical pickup 90 for performing recording or reproduction of data is provided at a location under the optical disk 50. The optical pickup 90 is supported by a feed screw 92 so as to be movable in the radial direction of the optical disk 50. In accordance with the instruction output from the system control circuit 62, a feed motor 94 is driven by a motor driver 96, thereby rotating the feed screw 92 so that the optical pickup 90 is moved in the radial direction of the optical disk 50. The radial direction position of the optical pickup 90 on the optical disk 50 is detected by a feed position sensor 98 such as a linear scale.

The entirety of the disk radial feed mechanism having the feed screw 92 and the feed motor 94 is movably supported by a feed screw 101 disposed in parallel with the plane of the disk 50 perpendicular to the feed screw 92, so as to be movable in the direction tangent to a track (i.e., a direction perpendicular to a feed direction in the radial direction of the disk). In accordance with an instruction output from a system control circuit 105, a feed motor 103 is driven by a motor driver 107 so as to rotate the feed screw 101. As a result, the optical pickup 90 is moved in the direction tangent to a track. The position of the optical pickup 90 in the direction tangent to a track is detected by a feed position sensor 109 such as a linear scale.

Figure 14A:
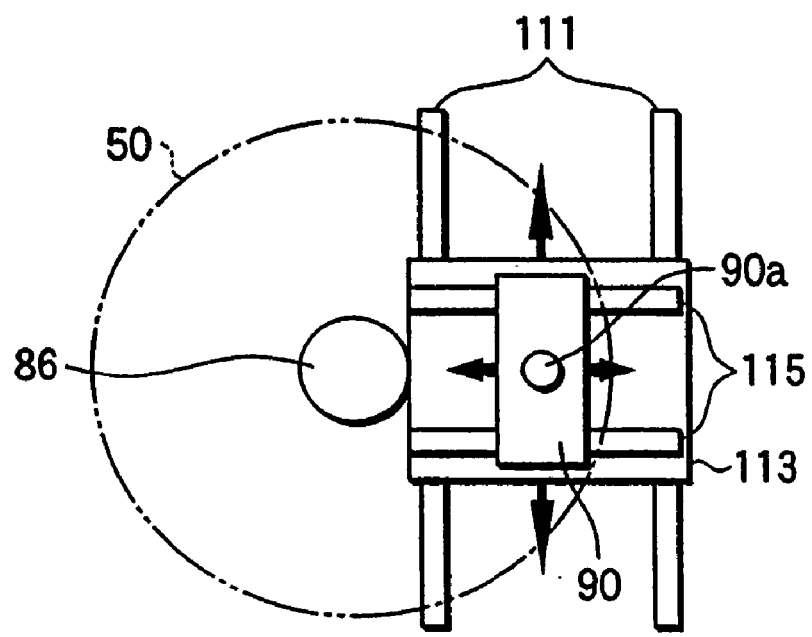
FIGS. 14A and 14B are plan and front views showing an example layout of the CD-R/RW drive feed mechanism shown in FIG. 13.
Figure 14B:
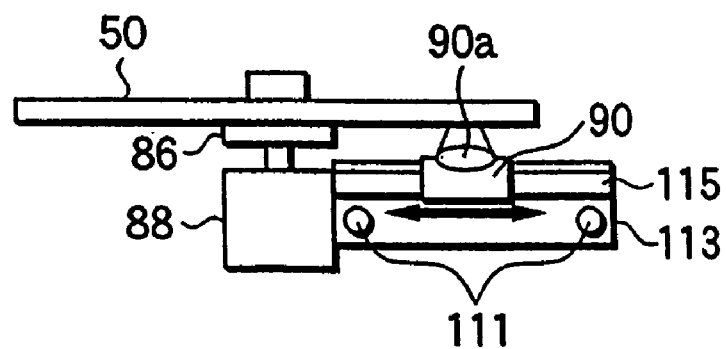

FIGS. 14A and 14B show a layout of a feed mechanism (neither a feed motor nor a feed screw is shown) as example. Slide bars 111 are provided in and fixed to a mechanical base of the CD-R/RW drive 84 in parallel with the plane of the optical disk 50. An optical pickup unit 113 is slidably supported on the slide bar 111. The optical pickup unit 113 is moved along the slide bars 111 by the feed motor 103 and the feed screw 101 (shown in FIG. 13). Slide bars 115 are mounted on and fixed to the optical pickup unit 113 in parallel with the plane of the optical disk 50 and perpendicular to the slide bars 111. The optical pickup 90 is slidably supported by the slide bars 115 and is moved along the slide bars 115 by the feed motor 94 and the feed screw 92 (shown in FIG. 13). At the time of printing operation, feed mechanisms feeding in two directions are driven. At the time of recording/reproduction of data, only the mechanism feeding operation in the radial direction of a track (simply a "track-radial-direction feed mechanism") is driven, and the mechanism feeding in the direction tangent to a track (simply a "track-tangential-direction feed mechanism") is stopped in a neutral position thereof (i.e., the position in which an objective lens 90a of the optical pickup 90 is moved in the radial direction of a disk by driving the track-radial-direction feed mechanism).

Figure 15A:
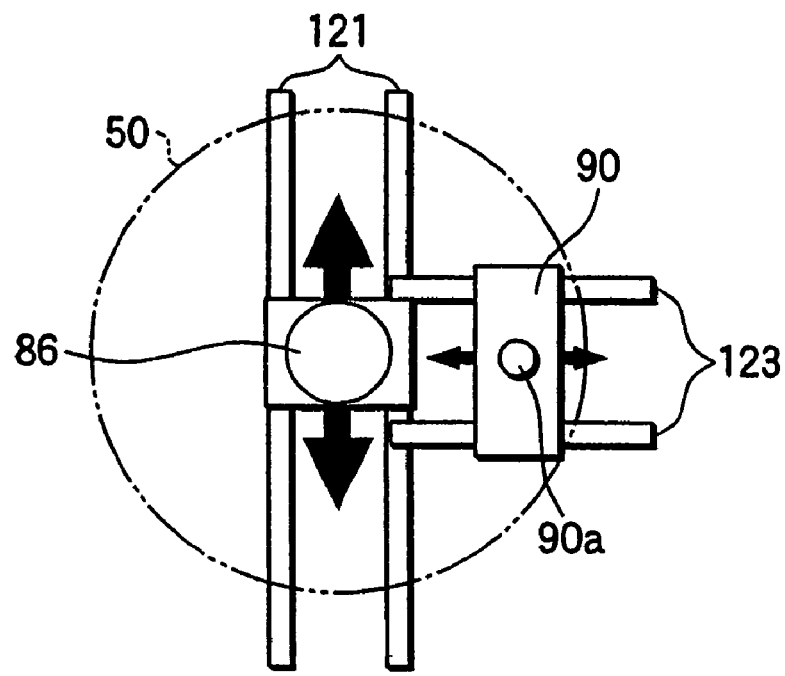
FIGS. 15A and 15B are plan and front views showing the example layout of the CD-R/RW drive feed mechanism shown in FIG. 13.
Figure 15B:
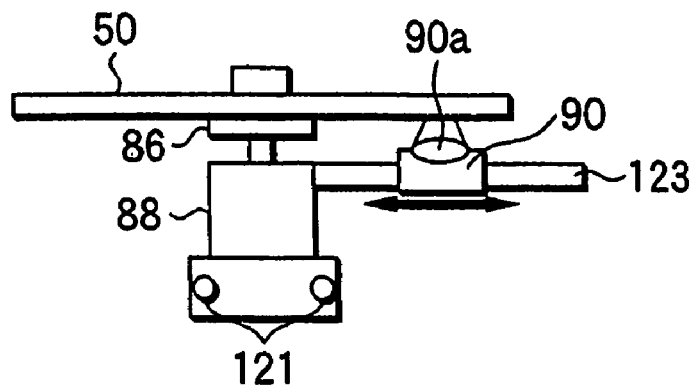

The track-tangential-direction feed mechanism can move the spindle motor 88 instead of moving the optical pickup 90. In this case, a feed screw 117 and a feed motor 119 for moving the spindle motor 88 in the same direction are provided in place of the feed screw 101 and the feed motor 103 for moving the optical pickup 90 in the direction tangent to a track. FIGS. 15A and 15B show a layout of the feed mechanism in such a case (neither the feed motor 119 nor the feed screw 117 is shown) as an example. Slide bars 121 are provided in and fixed to a mechanical base of the CD-R/RW drive 84 in parallel with the plane of the optical disk 50. A spindle motor 88 is slidably supported by the slide bars 121. The spindle motor 88 is moved along the slide bars 121 by a feed motor 119 and a feed screw 117 (see FIG. 13). Slide bars 123 are mounted on and fixed to a mechanical base of the CD-R/RW drive 84. The optical pickup 90 is slidably supported by the slide bars 123 and is moved along the slide bars 123 by the feed motor 94 and the feed screw 92 (shown in FIG. 13). At the time of printing operation, feed mechanisms feeding in two directions are driven. At the time of recording/reproduction of data, only the track-radial-direction feed mechanism is driven. The track-tangential-direction feed mechanism is stopped in a neutral position thereof (i.e., the position in which an objective lens 90a of the optical pickup 90 is moved in the radial direction of a disk by driving the track-radial-direction feed mechanism).

In FIG. 13, in accordance with an instruction output from the system control circuit 105, a focus servo circuit 125 actuates a focus actuator of the optical pickup 90 on the basis of a focus error signal, thus performing focus control operation. At the time of printing a label, the focus servo circuit 125 is turned on. At the time of recording or reproduction of data, a tracking servo circuit 127 actuates a tracking actuator of the optical pickup 90 on the basis of a tracking error signal in accordance with the instruction output from the system control circuit 105, thus performing tracking control operation. At the time of printing a label, the tracking servo circuit 127 is turned off. At the time of printing a label, the vibration signal generation circuit 129 generates a predetermined vibration signal in accordance with the instruction output from the system control circuit 105, and supplies the vibration signal to the tracking actuator. Accordingly, an object lens of the optical pickup 90 is vibrated in the radial direction of the optical disk to bridge a gap between the areas circularly scanned by a laser beam, as a result of which there is obtained a print product having no gaps.

In accordance with the instruction output from the system control circuit 105, a laser driver 131 drives a laser diode of the optical pickup 66 to emit a laser beam onto the optical disk 50, thereby performing recording/reproduction of data or printing of a label surface. At the time of recording of data, the laser diode outputs a laser beam of recording power modulated by a recording signal, by driving action of the laser driver 131. At the time of reproduction of data, the laser diode outputs a laser beam whose recording power has a fixed predetermined reproducing power. At the time of printing label, the laser diode outputs a laser beam modulated with image data pertaining to characters or graphic images to be printed (i.e., a laser beam has high power to cause changes in the visible light characteristic changing layer in an area to be printed and a laser has low power so as not to cause changes in the visible light characteristic changing layer in an area not to be printed). At the time of printing a label, a host computer 133 transmits, to the CD-R/RW drive 84, image data pertaining to characters or graphic images to be edited by the user and to be printed. The image data are constituted by dot-matrix data (e.g., data which specify a print segment in the direction tangent to a track represented by "t," for each radial position "r" at a predetermined pitch Ar) represented by coordinates (r, t), the coordinates corresponding to a combination of a radial position "r" of an optical disk, which is a distance from an appropriate reference position (e.g., rotation center) in the radial direction of the disk, and a position "t" in the direction tangent to a track, which is a distance from the appropriate reference position in the direction tangent to a track.

Process of printing data on a label surface of the optical disk 50 by the CD-R/RW drive 84 shown in FIG. 13 is performed in the manner described below.

(1) The optical disk 50 is set on the turntable 86 while being inverted in case of recording data or reproducing, i.e. the optical disk 50 is set so as to face the surface of the optical disk 50, which the label is to be printed, to the optical pick up 90.

(2) A user edits, on a display of the host computer 133, characters or a graphic image such as a picture to be printed. The host computer 133 converts the thus-edited image into image data.

(3) The user instructs to start printing operation on the host computer 133.

(4) The spindle motor 88 is stopped in accordance with the instruction output from the system control circuit 105 during the course of printing operation.

(5) The optical pickup 90 is positioned in a predetermined reference position.

(6) The laser driver 131 drives the laser diode so that laser power of the laser diode of the optical pickup 90 is to be a predetermined low output instructed by the system control circuit 105 (i.e., a value at which no changes arise in the visible light characteristic changing layer and focus control operation can be effected; for example, a value of 1 mW or less).

(7) In accordance with the instruction output from the system control circuit 105, the focus servo circuit 125 is turned on. As a result, the focus servo circuit 125 performs focus servo operation so that the laser beam forms the minimum spot on the reflection layer. Here, the tracking servo circuit 127 remains off, and no tracking servo operation is effected.

(8) Through the foregoing operations, preparation for printing is made, and printing is commenced in accordance with the instruction output from the system control circuit 105. That is, the system control circuit 105 receives image data from the host computer 133 to drive the feed motor 94 to position the optical pickup 90 in a radial position at the inner radius of the optical disk 50, where a first print location is present. The motor 103 (or 119) is driven at the radial position, to move a laser beam to the direction tangent to a track. In connection with the radial position on the disk, laser power is switched to a predetermined high output (a value at which changes arise in the visible light characteristic changing layer: for example, a value of 1 mW or more) over a print segment in the direction tangent to a track instructed on the basis of image data. As a result, changes (i.e., discoloration) arise in the reflection characteristic changing layer at the location exposed to the laser beam of high output power, thereby performing the printing operation. Then, the feed motor 94 is driven to move the optical pickup 90 toward an outer circumference at a predetermined pitch Δr, and then with respect to this radial position on the disk, the laser power is switched to a predetermined high output level over the print segment in the direction tangent to a track instructed on the basis of the image data while the optical pickup 90 is moved in that position in the direction tangent to a track, thereby performing printing operation. This printing operation sequentially repeated so that the optical pickup 90 is moved toward the outer circumference at the predetermined pitch Δr. FIG. 16 shows the locus of movement of the laser beam over the label surface 52 of the optical disk 50 through the printing operation and a resultant print product. The laser beam is moved while being vibrated by the vibration signal, there is produced a print product having no gaps (or having small gaps).

In the present embodiment, the visible light characteristic changing layer is interposed between a reflection layer and a protective layer. However, the optical disk according to the present invention is not limited to such a structure. The visible light characteristic changing layer can be provided in any area (e.g., on a protective layer) viewed from a part of a label surface of an optical disk. Although the embodiment has described a case where the optical disk according to the present invention having a visible light characteristic changing layer formed integrally is subjected to printing, printing required by the label surface printing method and optical disk unit according to the present invention is not limited to such printing. More specifically, an optical disk to which a label having a visible light characteristic changing layer is affixed can be subjected to printing by application of the label surface printing method and optical disk unit according to the present invention. In the embodiment, a label surface is subjected to printing while focus servo operation is being performed. However, when no request exists for a print resolution, printing can be performed without involvement of focus servo operation. In that case, reflected light required for effecting focus servo operation is not necessary. Hence, the visible light characteristic changing layer can be formed into a translucence form so as not to be able to see reflection layer through the visible light characteristic changing layer. In the embodiment, printing is performed by using modulating power of the laser beam in accordance with image data. However, if there are parameters other than power which enable occurrence of changes in the visible light characteristic changing layer by using modulating power in accordance with image data, printing can be performed by modulating the parameters. The embodiment has described a case where changes arising in the visible light characteristic changing layer correspond to discoloration. However, the present invention is not limited to this embodiment. Any type of change may be employed, so long as the change is visually recognizable. In the embodiment, an optical disk is sequentially subjected to printing from its internal circumference to outer circumference. However, the present invention is not limited to such a sequence. An optical disk may be sequentially subjected to printing from its outer to inner circumference, or in another appropriate sequence. The embodiment has described a case where a CD-R disk or CD-RW disk is subjected to printing. However, the present invention can also be applied to a case where another type of optical disk is subjected to printing. Moreover, the embodiment has described a case where the present invention has been applied to the optical disk unit which is used while being connected to a host computer. However, the present invention can be also applied to an optical disk unit which is used in a standalone manner, such as a CD recorder.

What is claimed is:

1. A method of forming a label of an optical medium using an optical drive configured to write data on an optical medium, wherein a user forms visible information, the visible information being used to form at least part of the label, the method comprising the acts of:

providing the optical medium having a data layer and label layer;

arranging the optical medium in the optical drive to irradiate a laser beam of an optical pickup on the label layer;

receiving image data relating to the visible information;

rotating, via the optical drive, the optical medium at a first constant angular velocity; and forming, with the laser beam of the optical pickup using the received image data, the visible information in the label layer of the optical medium while rotating the optical medium at the first constant angular velocity, wherein the optical pickup operates at a first power level when changing a visible light characteristic of the optical medium to form the visible information and the optical pickup operates at a lower power level when not changing a visible light characteristic of the optical medium, and wherein a tracking servo operation is turned off while the optical pickup forms the visible information.

2. The method of claim 1, wherein the first constant angular velocity is maintained while the optical pickup moves a defined amount in a radial direction.

3. The method of claim 2, wherein the defined amount extends across a label surface of the optical medium.

4. The method of claim 1, wherein the laser beam is a CD laser beam.

5. The method of claim 4, wherein the laser beam has a wavelength of 780 nm.

6. The method of claim 1, further comprising the acts of:
generating a frequency pulse related to the rotation of the optical medium; and
controlling, based on the frequency pulse, the rotation of a motor that rotates the optical medium in order to maintain the first constant angular velocity.

7. The method of claim 1, wherein the label side of the optical medium includes a visible light characteristic changing layer, a portion of which changes when the optical pickup operates at the first power level.

8. An optical drive system configured for a user to form visible information on an optical medium, the visible information being used to form at least part of a label, the system comprising:
an optical medium having a data layer and a label layer;
an optical pickup;
a turn-table which receives the optical medium to irradiate a laser beam of the optical pickup on the label;
a motor which rotates the optical medium at a first constant angular velocity;
a system controller, coupled to the motor and the optical pickup, which receives image data relating to the visible information, wherein the laser beam of the optical pickup, based on the image data, forms the visible information in the label layer of the optical medium while the motor rotates the optical medium at the first constant angular velocity,
wherein the optical pickup operates at a first power level when changing a visible light characteristic of the optical medium to form the visible information and the optical pickup operates at a lower power level when not changing a visible light characteristic of the optical medium, and
wherein a tracking servo operation is turned off while the optical pickup forms the visible information.

9. The system of claim 8, wherein the first constant angular velocity is maintained while the optical pickup moves a defined amount in a radial direction.

10. The system of claim 9, wherein the defined amount extends across a label surface of the optical medium.

11. The system of claim 8, wherein the laser beam is a CD laser beam.

12. The system of claim 11, wherein the laser beam has a wavelength of 780 nm.

13. The system of claim 8, wherein a frequency pulse is generated in relation to the rotation of the optical medium, the apparatus further comprising:
a spindle servo, coupled to the motor and the system controller, which controls the rotation of the motor to maintain the first constant angular velocity based on the frequency pulse.

* * * * *